(12) United States Patent
Kim

(10) Patent No.: US 7,924,481 B2
(45) Date of Patent: Apr. 12, 2011

(54) IMAGE READING DEVICE AND IMAGE FORMING APPARATUS HAVING THE SAME

(75) Inventor: Hong Seong Kim, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 568 days.

(21) Appl. No.: 12/036,447

(22) Filed: Feb. 25, 2008

(65) Prior Publication Data
US 2008/0225354 A1    Sep. 18, 2008

(30) Foreign Application Priority Data

Mar. 12, 2007   (KR) ................. 10-2007-0024224

(51) Int. Cl.
*H04N 1/04* (2006.01)
(52) U.S. Cl. ........ 358/496; 358/498; 399/364; 399/367; 399/374; 399/376
(58) Field of Classification Search ............ 358/498, 358/496; 399/364, 367, 373, 374, 376; 355/23, 355/24; 318/318
See application file for complete search history.

(56) References Cited

U.S. PATENT DOCUMENTS

| | | | |
|---|---|---|---|
| 5,181,714 A * | 1/1993 | Yamagishi et al. | 271/186 |
| 5,430,536 A | 7/1995 | Fullerton et al. | |
| 7,359,097 B2 * | 4/2008 | Oomori et al. | 358/498 |
| 2006/0280534 A1 * | 12/2006 | Cook et al. | 399/374 |
| 2007/0003344 A1 * | 1/2007 | Lee et al. | 399/374 |
| 2008/0043294 A1 * | 2/2008 | Su et al. | 358/474 |

FOREIGN PATENT DOCUMENTS

| | | |
|---|---|---|
| CN | 2669281 | 1/2005 |
| JP | 02063262 A * | 3/1990 |

OTHER PUBLICATIONS

Chinese Office Action issued Mar. 22, 2010 in CN Application No. 200810080835.7.

* cited by examiner

*Primary Examiner* — Cheukfan Lee
(74) *Attorney, Agent, or Firm* — Stanzione & Kim, LLP

(57) ABSTRACT

An image reading device and an image forming apparatus and methods thereof can achieve a duplex scanning operation and enable a user to easily arrange the scanned documents after being discharged. The image reading device may include a supply path coupled to a document supply port, a simplex document feeding path coupled to the supply path to first guide the document to the scan unit, a duplex document feeding path coupled to the supply path to second guide the document to the scan unit to scan a first surface of the document, and a duplex document circulating path to communicate with the duplex document feeding path and guide a second surface of the first surface scanned document to the scan unit.

17 Claims, 9 Drawing Sheets

IMAGE READING DEVICE AND IMAGE FORMING APPARATUS HAVING THE SAME

CROSS-REFERENCE TO RELATED APPLICATIONS

This application claims the benefit under 35 U.S.C. §119 (a) from Korean Patent Application No. 2007-0024224, filed on Mar. 12, 2007 in the Korean Intellectual Property Office, the disclosure of which is incorporated herein by reference in its entirety.

BACKGROUND OF THE INVENTION

1. Field of the Invention

The present general inventive concept relates to an image reading device and an image forming apparatus having the same, and more particularly, to an image reading device, an image forming apparatus having the same, and methods thereof that are capable of achieving duplex scanning of a document.

2. Description of the Related Art

An image forming apparatus is an apparatus that prints an image on a printing medium, e.g., paper, according to an inputted image signal. An image forming apparatus is classified as a printer, a copying machine, a multi-function printer that has multiple functions of printing, copying and scanning, and the like. For example, a multi-function printer can perform a printing function of printing an image in response to image information from an external apparatus such as a computer, etc., a reading function of reading image information recorded on a document, a copying function of printing an image in response to scanned image information, and a fax function of transmitting scanned image information to a remote place through communication links.

In order to achieve the above functions, a multi-function image forming apparatus is equipped with an image reading device. An example of a prior art image reading device is disclosed in U.S. Pat. No. 5,430,536.

The disclosed prior art image reading device includes an input tray on which a document to be scanned is loaded, an output tray on which the scanned document is loaded, and a U-shaped document path that is formed between the input tray and the output tray. Image information recorded on one surface of the document passing through the document path is scanned by a raster input scanner (RIS). The disclosed prior art image reading device further includes a duplex document path that connects a downstream side of the RIS and an upstream side of the RIS to achieve the duplex scanning. In the duplex scanning operation, the document fed toward the output tray after one surface (e.g., a first surface) is scanned is reversely fed at a specific point of time to pass through the duplex document path. The document having passed through the duplex document path passes again through the document path so that the other surface (e.g., a second surface) is scanned.

In such a duplex scanning operation, if the document is discharged immediately after the first and second surfaces are scanned, the documents are piled unevenly on the output tray such that a user has difficulty in arranging the documents. To solve this problem, the prior art image reading device is configured not to discharge the document immediately after scanning the first and second surfaces of the document in the duplex scanning operation but to reversely circulate the document one more time to sort the duplex scanned documents in page order.

However, it is practically inefficient to circulate the duplex scanned document one more time just for the page sorting. Further, the additional reversal and circulation of the document cause a considerable decrease in the duplex scanning speed.

Also, in the disclosed prior art image reading device, the document that is reversely fed after the first surface is scanned or the document that is reversely fed for the page sorting may interfere with the document loaded on the output tray. Such interference between the document fed reversely and the document loaded on the output tray may cause problems in that the scanning operation is not achieved smoothly and the document loaded on the output tray may be drawn back into the image reading device together with the document that is reversely fed.

SUMMARY OF THE INVENTION

The present general inventive concept provides an image reading device, an image forming apparatus having the same, and/or methods thereof that can achieve a duplex scanning operation or enable a user to easily arrange documents that have been discharged after being scanned.

The present general inventive concept also provides an image reading device and an image forming apparatus having the same that is capable of reducing a likelihood of or preventing a document undergoing duplex scanning from interfering with a document that has been already discharged.

Additional aspects and/or utilities of the present general inventive concept will be set forth in part in the description which follows and, in part, will be obvious from the description, or may be learned by practice of the present general inventive concept.

The foregoing and/or other aspects and utilities of the present general inventive concept may also be achieved by providing an image reading device capable of performing a simplex scanning operation to scan only one surface of a document and a duplex scanning operation to scan two surfaces of the document, the image reading device including a scan unit to read information recorded on the document, a supply path coupled to a document supply port, a simplex document feeding path to branch from the supply path in a first direction to guide the document to the scan unit in the simplex scanning operation, a duplex document feeding path to branch from the supply path in a second direction to guide the document to the scan unit to scan a first surface of the document in the duplex scanning operation, and a duplex document circulating path with a first end to communicate with the duplex document feeding path to guide the document whose first surface has been scanned to the scan unit in the duplex scanning operation.

The simplex scanning operation may scan an upper surface of the document and the duplex scanning operation may scan a lower surface of the document first.

The image reading device may be configured such that a direction in which the document guided through the simplex document feeding path passes by the scan unit is opposite to a direction in which the document guided through the duplex document feeding path passes by the scan unit.

Also, the image reading device may be configured such that a direction in which the document guided through the duplex document feeding path passes by the scan unit is opposite to a direction in which the document guided through the duplex document circulating path passes by the scan unit.

The image reading device may further include a white roller mounted opposite to the scan unit to rotate in a forward direction or in a reverse direction to feed the document.

The image reading device may further include a discharge path coupled to a document discharge port. The document passing through the discharge path in the duplex scanning operation is fed in only one direction.

The duplex document circulating path may have a second end coupled to the simplex document feeding path. The simplex document feeding path may be sectioned into a first path portion on an upstream side and a second path portion on a downstream side of a junction point with the second end of the duplex document circulating path, and the duplex document circulating path and the second path portion have lengths such that a total length thereof is longer than a length of the document.

The image reading device may further include a path converting unit mounted on a point where the simplex document feeding path and the duplex document feeding path bifurcate from the supply path to selectively guide the document having passed through the supply path to one of the simplex document feeding path or the duplex document feeding path.

The image reading device may further include a first path guide unit to close the duplex document feeding path and open the discharge path when the document having passed through the duplex document circulating path is fed toward the discharge path.

Also, the image reading device may further include a second path guide unit to close the simplex document feeding path and open the duplex document circulating path when the document having passed through the duplex document feeding path is fed toward the duplex document circulating path.

The foregoing and/or other aspects and utilities of the present general inventive concept may also be achieved by providing an image reading device having document feeding paths to pass a document and a scan unit to read information recorded on the document, the document feeding paths including a supply path to connect to a document supply port, a simplex document feeding path to branch from the supply path to guide the document from the supply path to reach the scan unit with upper and lower surfaces of the document turned over, a duplex document feeding path to branch from the supply path to guide the document from the supply path to reach the scan unit with the upper and lower surfaces of the document maintained, and a duplex document circulating path to communicate with the duplex document feeding path to guide the document whose first surface has been scanned by the scan unit to the scan unit with the upper and lower surfaces of the document turned over.

The image forming apparatus may further include a white roller disposed opposite to the scan unit that can rotate in a forward direction and in a reverse direction.

The document feeding paths may further include a discharge path connected at a first end to a document discharge port and at a second end to the duplex document feeding path.

The duplex document circulating path has a first end to join the simplex document feeding path at a point near the scan unit and a second end to connect to the simplex document feeding path on an upstream side of the point.

The image forming apparatus may further include a first path guide unit to close the duplex document feeding path and open the discharge path when the document having passed through the duplex document circulating path is fed toward the discharge path. The first path guide unit may have a function of a sensor to detect a position of the document when the document is fed from the duplex document feeding path to the duplex document circulating path.

Also, the image forming apparatus may further include a second path guide unit to close the simplex document feeding path and open the duplex document circulating path when the document having passed through the duplex document feeding path is fed toward the duplex document circulating path. The second path guide unit may have a function of a sensor to detect a position of the document when the document is fed from the duplex document circulating path to the discharge path.

The foregoing and/or other aspects and utilities of the present general inventive concept may also be achieved by providing an image reading device including a scan unit, a simplex document feeding path to guide a document from a supply port to the scan unit in a first direction to scan a first side of the document in a simplex scanning, and a duplex document feeding path to guide the document from the supply port to the scan unit in a second direction to scan the first side of the document and to guide the document to the scan unit to scan a second side of the document.

The image reading device may include a document scanned by the scan unit in the first direction in the simplex document feeding path, and the document is scanned by the scan unit in the second direction and the first direction in order in the duplex document feeding path.

The image reading device may further include the document comprises a plurality of sheets in order to be fed through the simplex document feeding path and the duplex document feeding path, and the sheets are discharged to be stacked in the same order after being scanned by the scan unit through the simplex and duplex document feeding paths.

Also, the image reading device may further include a duplex document circulating path to receive the document in the second direction and to guide the document to the scan unit in the first direction.

The foregoing and/or other aspects and utilities of the present general inventive concept may also be achieved by providing guiding a document from a supply port to a scan unit in a first direction to scan a first side of the document in a simplex scanning, and guiding the document from the supply port to the scan unit in a second direction to scan the first side of the document to guide the document to the scan unit in the first direction to scan a second guide of the document in a duplex scanning.

BRIEF DESCRIPTION OF THE DRAWINGS

These and/or other aspects and utilities of exemplary embodiments of the present general inventive concept will become apparent and more readily appreciated from the following description of such embodiments of the present general inventive concept, taken in conjunction with the accompanying drawings, of which.

DETAILED DESCRIPTION OF EMBODIMENTS

Figure 1:
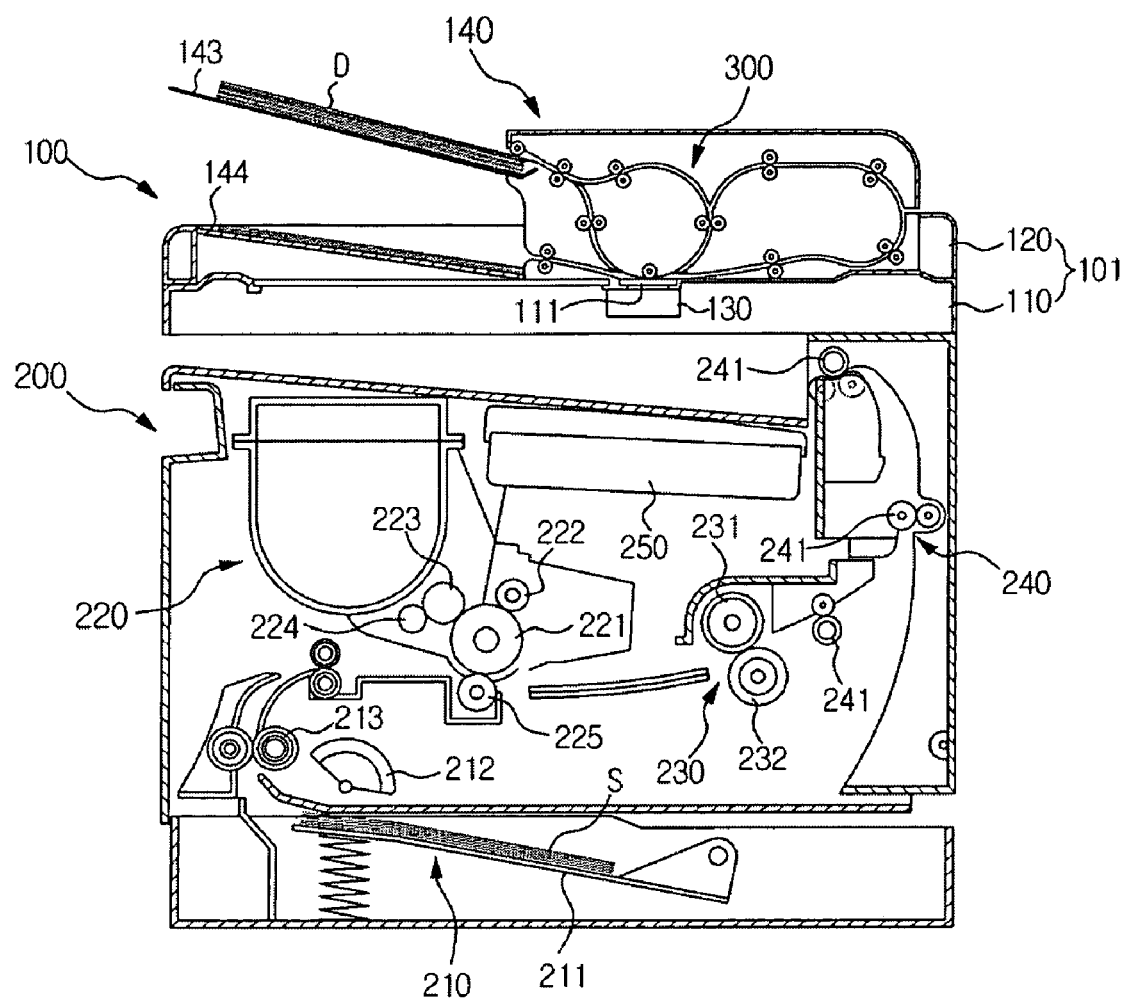
FIG. 1 is a diagram illustrating an image forming apparatus according to an embodiment of the present general inventive concept.

Reference will now be made in detail to exemplary embodiments of the present general inventive concept, examples of which are illustrated in the accompanying drawings, wherein like reference numerals refer to like elements throughout. The exemplary embodiments are described below to explain the present general inventive concept by referring to the figures.

Figure 2:
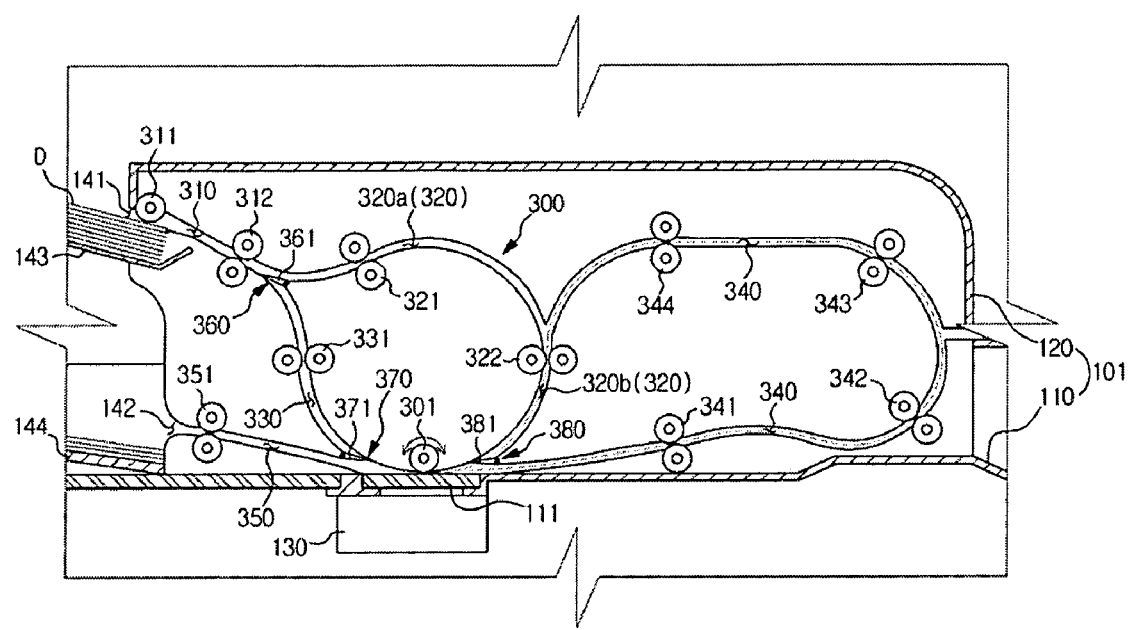
FIG. 2 is a diagram illustrating a partial constitution extracted from FIG. 1.

FIG. 1 is a diagram illustrating an image forming apparatus according to an embodiment of the present general inventive concept, and FIG. 2 is a view of a partial constitution extracted from FIG. 1.

As illustrated in FIG. 1, the image forming apparatus of the present general inventive concept includes an image reading device 100 that reads image information recorded on a document, and a printing device 200 that prints an image on a printing medium, e.g., paper.

The printing device 200 prints the image in response to a signal from the image reading device 100 or a signal from an external apparatus such as a computer, etc. The printing device 200 may include a paper supply unit 210 to supply a printing medium, e.g., paper S, a developing unit 220 to develop the image on the paper, a fixing unit 230 to fix the developed image to the paper by applying heat and pressure to the paper, and a paper discharge unit 240 to discharge the printed paper outside.

The paper supply unit 210 may include a paper tray 211 on which the paper S is loaded, and a paper pickup roller 212 that picks up the paper S loaded on the paper tray 211 sheet by sheet. The paper that is picked up by the paper pickup roller 212 is preferably fed toward the developing unit 220 by a paper feed roller 213.

The developing unit 220 may include a photosensitive drum 221 on which an electrostatic latent image is formed by an exposure unit 250, a charge roller 222 that charges the photosensitive drum 221, a developing roller 223 that develops the electrostatic latent image formed on the photosensitive drum 221 into a toner image, a supply roller 224 that supplies a toner to the developing roller 223, and a transfer roller 225 that pushes the paper toward the photosensitive drum 221 to transfer the toner image developed on the photosensitive drum 221 onto the paper.

The fixing unit 230 may include a heat roller 231 that has a heat source to heat the toner image transferred onto the paper, and a press roller 232 that is disposed opposite to the heat roller 231 to maintain the constant fixing pressure with the heat roller 231. Although FIG. 1 illustrates the developing unit 220 and the fixing unit 230 to print an image, the present general inventive concept is not limited thereto. An inkjet image forming unit can be used to form an image on the paper.

The paper discharge unit 240 may include paper discharge rollers 241 that are sequentially mounted so as to discharge the paper having passed through the fixing unit 230 outside.

As illustrated in FIGS. 1 and 2, the image reading device 100 may include a main body 101 having a scanning frame 110 and a cover 120. The cover 120 is hingedly coupled to the scanning frame 110 to open and close the top surface of the scanning frame 110.

A scan unit 130 is mounted inside the scanning frame 110. An automatic document feeder (ADF) 140 that automatically feeds the documents for successive scanning is preferably provided at the cover 120.

A scanning window 111 may be provided on the top of the scanning frame 110 to irradiate light to the document that is fed by the ADF 140. The scanning window 111 is exposed to a document feeding path 300 that will be described later. The scan unit 130 is preferably disposed beneath the scanning window 111 to read image information recorded on the document passing through the document feeding path 300 by irradiating light to the document. For example, the scan unit 130 may irradiate light to the document and detect the light reflected from the document. By converting the light intensity into an electric signal, the scan unit 130 preferably reads image information from the document. The scan unit 130 may be configured as a contact image sensor (CIS), a charge coupled device (CCD), or the like.

As illustrated in FIG. 2, the ADF 140 includes a document supply port 141 through which the document to be scanned is supplied, a document discharge port 142 through which the scanned document is discharged, a document feeding path 300 that is formed in the main body 101 to feed the document therethrough. Document moving devices such as rollers may be mounted at the document feeding path 300 to feed the document.

The document supply port 141 is formed at one side of the cover 120, and the document discharge port 142 is preferably formed below the document supply port 141. A document supply tray 143, on which the document D to be fed by the ADF 140 is loaded, is provided near the document supply port 141, and a document discharge tray 144, on which the scanned document is discharged and loaded, is provided near the document discharge port 142.

The document feeding path 300 may include a supply path 310 whose first end is connected to the document supply port 141, a simplex document feeding path 320 that may branched off from the supply path 310 in a first direction to guide the document to the scan unit 130 in the simplex scanning operation, a duplex document feeding path 330 that may branched off from the supply path 310 in a second direction to guide the document to the scan unit 130 to scan one surface of the document in the duplex scanning operation, a duplex document circulating path 340 that may circulate the document having passed through the duplex document feeding path 330 to guide again the document to the scan unit 130 to scan an opposite surface of the document, and a discharge path 350 whose first end may be connected to the document discharge port 142 and second end joins the duplex document feeding path 330.

The simplex document feeding path 320 and the duplex document feeding path 330 may bifurcate from the supply path 310 and may re-join at the position where the scanning window 111 is mounted. A white roller 301 may be mounted on the scanning window 111 opposite to the scan unit 130. The white roller 301 can rotate in the forward direction and in the reverse direction and can feed the document passing by the scan unit 130 while closely contacting the same to the upper surface of the scanning window 111.

The supply path 310 may include a document pickup roller 311 and supply rollers 312. The document pickup roller 311 picks up the document loaded on the document supply tray 143, and the supply rollers 312 feed the document which is picked up by the document pickup roller 311.

The simplex document feeding path 320 may guide the document fed through the supply path 310 so that the document reaches the scan unit 130 with the upper and lower surfaces of the document turned over. Thus, in the simplex scanning operation, the upper surface of the loaded document on the document supply tray 143 is turned over into the lower surface when it reaches the scan unit 130, and then the scan unit 130 mounted beneath the scanning window 111 scans the lower surface. At this time, the white roller 301 preferably rotates in the forward direction, e.g., in the clockwise direction, and feeds the document toward the discharge path 350.

On the other hand, the duplex document feeding path 330 may guide the document fed through the supply path 310 so that the document reaches the scan unit 130 with the upper and lower surfaces of the document unchanged. Thus, in the duplex scanning operation, the lower surface of the loaded document on the document supply tray 143 is maintained as the lower surface when it reaches the scan unit 130, and then the scan unit 130 mounted beneath the scanning window 111 scans the lower surface. At this time, the white roller 301 preferably rotates in the reverse direction, e.g., in the counterclockwise direction, and feeds the document toward the duplex document circulating path 340.

First feed rollers 321 and second feed rollers 322 may be mounted in the simplex document feeding path 320. Third feed rollers 331 may be mounted in the duplex document feeding path 330.

The duplex document circulating path 340 may guide the document whose first surface has been scanned by the scan unit 130 (e.g., first time) so that the document can reach again the scan unit 130 (e.g., second time) with the upper and lower surfaces of the document turned over. An inlet of the duplex document circulating path 340 preferably communicates with the duplex document feeding path 330, and joins the simplex document feeding path 320 at a point near the scan unit 130. An outlet of the duplex document circulating path 340 may be coupled to the simplex document feeding path 320 at a front of the mounting position of the second feed rollers 322. The document having passed through the duplex document circulating path 340 may advance into the simplex document feeding path 320 with the upper and lower surfaces of the document turned over (i.e., the upper surface of the document, which is not scanned yet, is turned over into the lower surface), and may be guided to the scan unit 130 to be scanned through the simplex document feeding path 320 (e.g., a portion). At this time, the white roller 301 may rotate in the forward direction, e.g., in the clockwise direction to feed the duplex scanned document (scanned twice) toward the discharge path 350.

The simplex document feeding path 320 may be sectioned into at least a first path portion 320a and a second path portion 320b based on the junction point with the duplex document circulating path 340. A total length of the duplex document circulating path 340 and the second path portion 320b (e.g., a length of a path shown by a dotted line in FIG. 2) is designed to be longer than the length of the document. If the total length of the duplex document circulating path 340 and the second path portion 320b is shorter than the length of the document then before the rear end of the document advancing into the duplex document circulating path 340 completely passes by the white roller 301, the front end of the document having circulated the path 340 may reach the white roller 301. In this case, the duplex scanning operation may not be achieved smoothly.

A path converting unit 360 may be mounted on the point where the simplex document feeding path 320 and the duplex document feeding path 330 bifurcate from the supply path 310. In the simplex scanning operation, the path converting unit 360 preferably operates so that the supply path 310 communicates with the simplex document feeding path 320.

In the duplex scanning operation, the path converting unit 360 preferably operates so that the supply path 310 communicates with the duplex document feeding path 330. The path converting unit 360 may include a path converting member 361, which is hingedly mounted or mounted for reciprocal movement in the supply path 310, and a solenoid (not shown) or the like may drive the path converting member 361.

A first path guide unit 370 may be mounted on the junction point between the duplex document feeding path 330 and the discharge path 350. When the document having passed through the duplex document circulating path 340 is fed toward the discharge path 350, the first path guide unit 370 can close the duplex document feeding path 330 and can open the discharge path 350. The first path guide unit 370 may be configured as an opening/closing member 371 (hereinafter "first opening/closing member") that may always be biased to close the duplex document feeding path 330 by elastic force of a spring (not shown) or the like. When the document is guided toward the scan unit 130 through the duplex document feeding path 330, the first opening/closing member 371 may move or pivot downward by the feeding force of the document and open the duplex document feeding path 330. Besides guiding the document, the first opening/closing member 371 may also function as a sensor to detect the position of the document. If the first opening/closing member 371, which has closed the duplex document feeding path 330, pivots downward by the feeding force of the document, it can be predicted that the front end of the document passing through the duplex document feeding path 330 will reach the scan unit 130 soon (e.g., after a prescribed time). If the first opening/closing member 371, which has pivoted downward, returns to its original position, it can be predicted that the rear end of the document passing through the duplex document feeding path 330 will reach the scan unit 130 soon (e.g., after a prescribed time).

A second path guide unit 380 may be mounted on the junction point between the simplex document feeding path 320 and the duplex document circulating path 340. When the document having passed through the duplex document feeding path 330 is fed toward the duplex document circulating path 340, the second path guide unit 380 can close the simplex document feeding path 320 and can open the duplex document circulating path 340. Similar to the first path guide unit 370, the second path guide unit 380 may be configured as an opening/closing member 381 (hereinafter "second opening/closing member") that may be biased to close the simplex document feeding path 320 by elastic force of a spring (not shown) or the like. When the document is guided toward the scan unit 130 through the simplex document feeding path 320, the second opening/closing member 381 may move or pivot downward by the feeding force of the document and open the simplex document feeding path 320. Similar to the first opening/closing member 371, the second opening/closing member 381 may additionally function as a sensor to detect the position of the document.

The duplex document circulating path 340 may include document guiding devices such as a series of rollers 341, 342, 343 and 344 (e.g., mounted) in the duplex document circulating path 340 to feed the document. Discharge rollers 351 or the like may be mounted in the discharge path 350 to discharge the document to the document discharge tray 144.

Method embodiments of operating of an image reading device and/or an image forming apparatus according to the present general inventive concept will now be described. Exemplary method embodiments may be applied to and will be described using but are not intended to be limited by embodiments illustrated in FIGS. 1-3 and 5A-5B.

Figure 3:
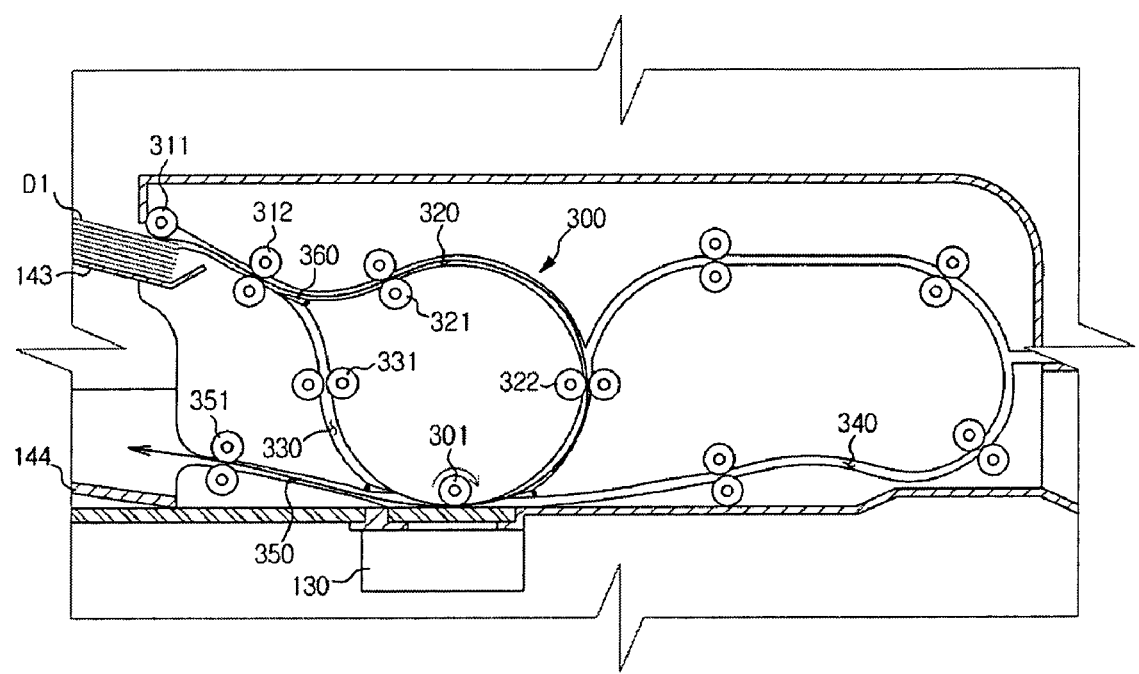
FIG. 3 is a view illustrating a simplex scanning operation of an image reading device according to an embodiment of the present general inventive concept.
Figure 4A:
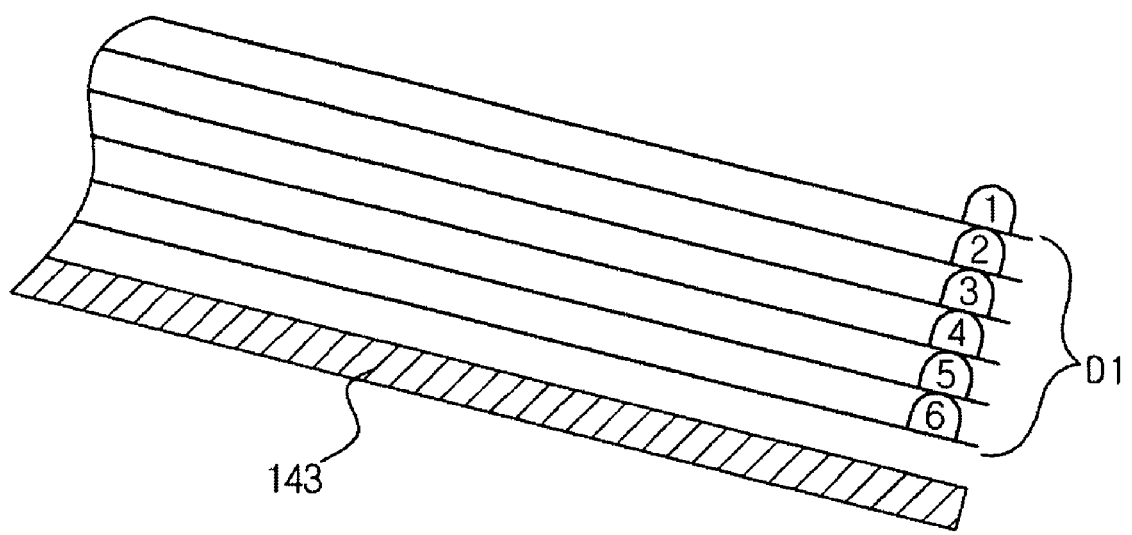
FIG. 4A is a view illustrating a state that simplex documents are loaded on a document supply tray in the simplex scanning operation.
Figure 4B:
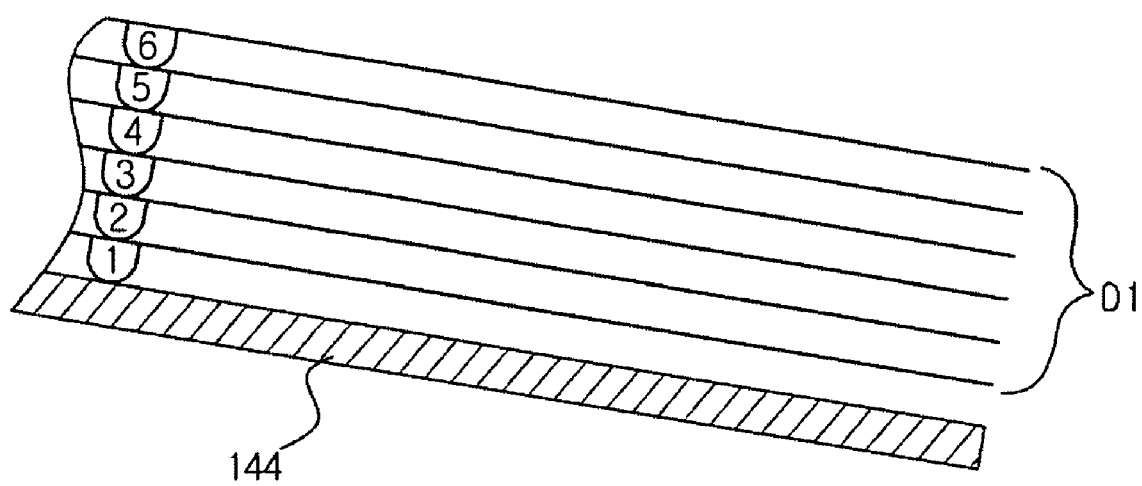
FIG. 4B is a view illustrating a state that simplex scanned documents are loaded on a document discharge tray.

First, a simplex scanning operation in which only one surface of the document is scanned will be described with reference to FIGS. 3, 4A and 4B. FIG. 3 is a diagram illustrating an embodiment of a simplex scanning operation of an image reading device according to the present general inventive concept, FIG. 4A is a diagram illustrating documents loaded on a document supply tray in the simplex scanning operation, and FIG. 4B is a diagram illustrating the simplex-scanned documents loaded on the document discharge tray.

In a simplex scanning operation embodiment, the simplex documents D1 are loaded on the document supply tray 143 such that the upper surfaces of the respective simplex documents are to be scanned. FIG. 4A illustrates that six simplex documents D1 are loaded in page order, from the first page to the sixth page (e.g., above to below). As shown in FIG. 3, in the simplex scanning operation, the path converting unit 360 may close the duplex document feeding path 330 to couple the supply path 310 with the simplex document feeding path 320. The white roller 301 may rotate in the clockwise direction. If the simplex scanning operation is started, the document D1 loaded on the document supply tray 143 may be picked up by the document pickup roller 311, and the picked-up document may advance into the simplex document feeding path 320 by the supply rollers 312. The document D1 passing through the simplex document feeding path 320 may advance or be guided toward the scan unit 130 by the first feed rollers 321 and the second feed rollers 322. The document D1 may pass between the white roller 301 and the scan unit 130 with the upper and lower surfaces of the document turned over. The document scanned by the scan unit 130 may be fed to the discharge path 350 by the white roller 301, and may be discharged to the document discharge tray 144 by the discharge rollers 351. At this time, as shown in FIG. 4B, the simplex documents D1 discharged to the document discharge tray 144 may be loaded in page order, from the first page to the sixth page (e.g., from below to above).

Figure 5A:
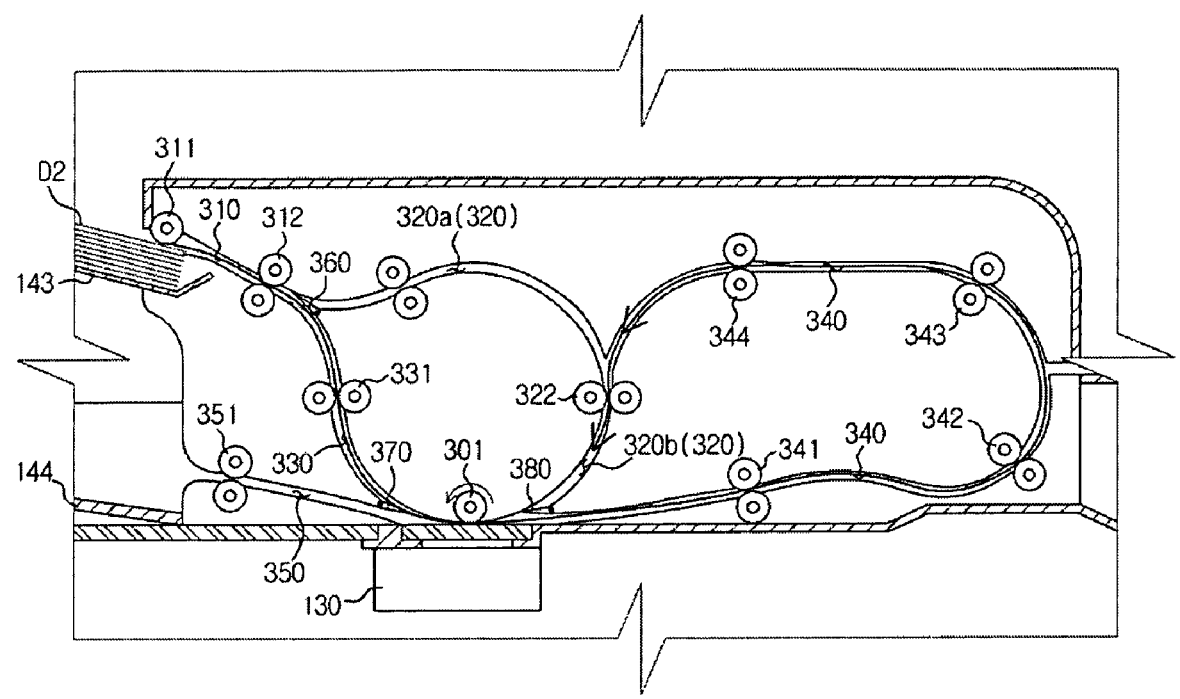
FIGS. 5A-5B are views illustrating a duplex scanning operation of an image reading device according to an embodiment of the present general inventive concept.
Figure 5B:
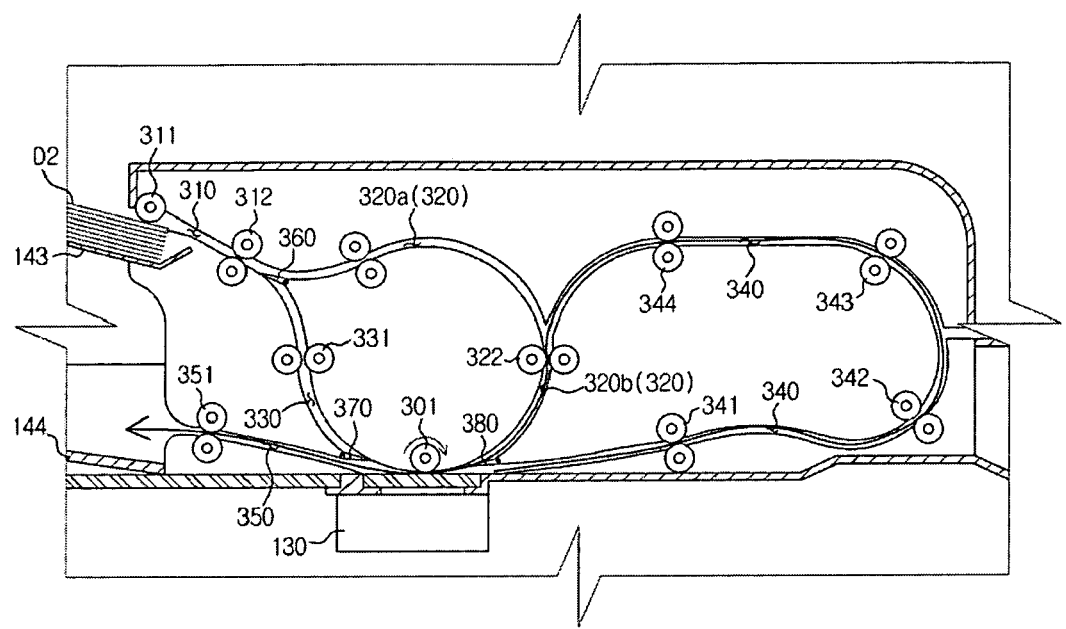

A duplex scanning operation embodiment in which both surfaces of the document are scanned will be described. FIGS. 5A-5B are diagrams illustrating an embodiment of a duplex scanning operation of an image reading device according to the present general inventive concept, FIG. 6A is a diagram illustrating duplex documents loaded on the document supply tray in the duplex scanning operation, and FIG. 6B is a diagram illustrating the duplex-scanned documents loaded on the document discharge tray.

Figure 6A:
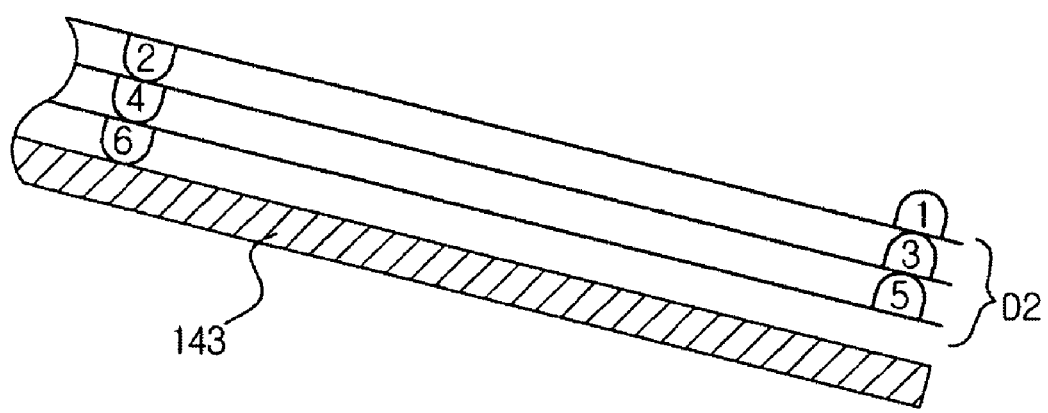
FIG. 6A is a view illustrating a state that duplex documents are loaded on the document supply tray in the duplex scanning operation.
Figure 6B:
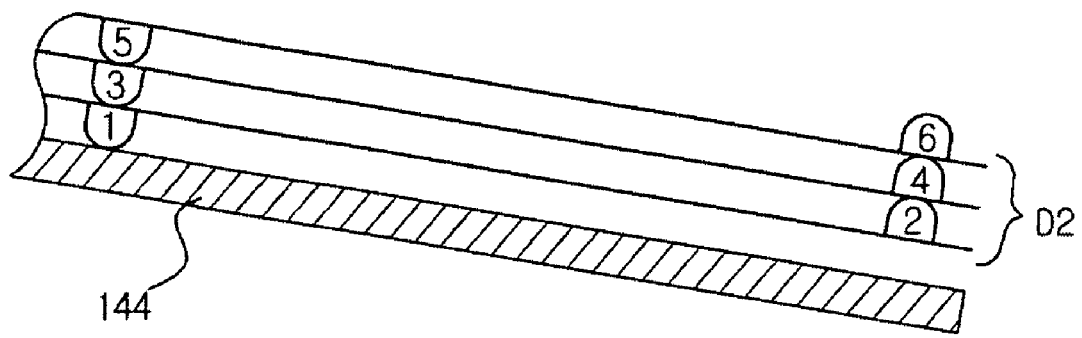
FIG. 6B is a view illustrating a state that duplex scanned documents are loaded on the document discharge tray.

In the duplex scanning operation, the duplex documents D2 are loaded on the document supply tray 143 as shown in FIG. 6A. As illustrated in FIG. 6B, three duplex documents D2 are loaded in page order, from the first page to the sixth page (e.g., from above to below).

As shown in FIG. 5A, in the duplex scanning operation, the path converting unit 360 may close the simplex document feeding path 320 to couple the supply path 310 with the duplex document feeding path 330. When the duplex scanning operation is started, the white roller 301 may rotate in the counterclockwise direction. If the duplex scanning operation is started, the document D2 loaded on the document supply tray 143 may be picked up by the document pickup roller 311, and the picked-up document may advance into the duplex document feeding path 330 by the supply rollers 312. The document D2 passing through the duplex document feeding path 330 may advance or be guided toward the scan unit 130 by the third feed rollers 331. While the document D2 passes between the white roller 301 and the scan unit 130, the lower surface of the document D2 is preferably scanned first. The front end of the document D2, whose lower surface has been scanned by the scan unit 130, may advance into the duplex document circulating path 340 by rotation of the white roller 301 in the counterclockwise direction. The front end of the document passing through the duplex document circulating path 340 may be engaged by the rollers 341, 342, 343 and 344 to advance into the second path portion 320b of the simplex document feeding path 320 and engaged by the second feed rollers 322 to be guided toward the scan unit 130.

In the above exemplary feeding process, the first path guide unit 370 may detect passing of the rear end of the document, and then, the white roller 301 may reversely rotate (e.g., in the clockwise direction) after a predetermined time as illustrated in FIG. 5B. While the document D2, having passed through the second path portion 320b of the simplex document feeding path 320, passes between the white roller 301 and the scan unit 130, the other surface of the document (the upper surface of the document D2) may be scanned. The duplex scanned document may be fed to the discharge path 350 by rotation of the white roller 301 in the clockwise direction and may be discharged to the document discharge tray 144 by the discharge rollers 351. Further, in the exemplary feeding process, the second path guide unit 380 may detect passing of the rear end of the document, and then, the white roller 301 may reversely rotate (e.g., in the counterclockwise direction) after a predetermined time. This can prepare for scanning of the next duplex document in the successive duplex scanning operation.

As shown in FIG. 6B, the duplex documents D2, which are discharged to the document discharge tray 144 after undergoing the above duplex scanning process may be loaded in page order, from the first page to the sixth page (e.g., from below to above). Accordingly, a user can easily arrange the documents only by turning over all of the documents loaded on the document discharge tray 144 once.

Meanwhile, if a printing command to print the image information read (e.g., scanned) as described above or a printing command from an external apparatus such as a computer is inputted, the paper S loaded on the paper tray 211 may be picked up by the paper pickup roller 212 fed along predetermined paths. While the paper passes through the developing unit 220 and the fixing unit 230, an image is printed on the paper. The printed paper having passed through the fixing unit 230 may be discharged outside by the paper discharge rollers 241.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with other ones of the embodiments. Furthermore, for ease of understanding, certain method procedures may have been delineated as separate procedures; however, these separately delineated procedures should not be construed as necessarily order dependent in their performance. That is, some procedures may be able to be performed in an alternative ordering, simultaneously, etc.

As apparent from the above description, embodiments of image forming apparatuses and methods according the present general inventive concept enable a user to easily arrange the documents discharged after being duplex scanned, without additionally circulating the documents to sort the documents in page order. Accordingly, efficiency and/or speed of the duplex scanning operation is increased.

Further according to embodiments, immediately after one surface (first surface) of a document is scanned, the other surface (second surface) of the document is scanned to increase the duplex scanning speed and/or decrease costs.

Still further, since the duplex scanning operation is achieved without a process of reversing the document in a document path or a discharge path, the document on the document discharge tray may not be (e.g., prevented from) drawn back into the apparatus in the duplex scanning operation.

Although a few embodiments of the present general inventive concept have been shown and described, it would be appreciated by those skilled in the art that changes may be made in this embodiment without departing from the principles and spirit of the general inventive concept, the scope of which is defined in the appended claims and their equivalents. As used in this disclosure, the term "preferably" is non-exclusive and means "preferably, but not limited to." Terms in the claims should be given their broadest interpretation consistent with the general inventive concept as set forth in this description. For example, the terms "coupled" and "connect" (and derivations thereof) are used to connote both direct and indirect connections/couplings. As another example, "having" and "including", derivatives thereof and similar transitional terms or phrases are used synonymously with "comprising" (i.e., all are considered "open ended" terms)—only the phrases "consisting of" and "consisting essentially of" should be considered as "close ended". Claims are not intended to be interpreted under 112 sixth paragraph unless the phrase "means for" and an associated function appear in a claim and the claim fails to recite sufficient structure to perform such function.

What is claimed is:

1. An image reading device to perform a simplex scanning operation to scan only one surface of a document and a duplex scanning operation to scan two surfaces of the document, comprising:
    a scan unit to read information recorded on the document;
    a supply path connected to a document supply port;
    a simplex document feeding path to branch from the supply path in a first direction to guide the document to the scan unit in the simplex scanning operation;
    a duplex document feeding path to branch from the supply path in a second direction to guide the document to the scan unit to scan a first surface of the document in the duplex scanning operation;
    a duplex document circulating path with a first end to communicate with the duplex document feeding path to guide the document whose first surface has been scanned to the scan unit in the duplex scanning operation;
    a first path guide unit to close the duplex document feeding path and open a discharge path when the document having passed through the duplex document circulating path is fed toward the discharge path; and
    a second path guide unit to close the simplex document feeding path and open the duplex document circulating path when the document having passed through the duplex document feeding path is fed toward the duplex document circulating path,
    wherein the simplex document feeding path and the duplex document circulating path share an overlap region, and the overlap region is located linearly between the duplex document feeding path and the duplex document circulating path.

2. The image reading device according to claim 1, wherein:
    when the simplex scanning operation is performed, a first surface of the document is scanned; and
    when the duplex scanning operation is performed, a second surface of the document is first scanned.

3. The image reading device according to claim 1, wherein the image reading device is configured such that a direction in which the document guided through the simplex document feeding path passes by the scan unit is opposite to a direction in which the document guided through the duplex document feeding path passes by the scan unit.

4. The image reading device according to claim 1, wherein the image reading device is configured such that a direction in which the document guided through the duplex document feeding path passes by the scan unit is opposite to a direction in which the document guided through the duplex document circulating path passes by the scan unit.

5. The image reading device according to claim 1, further comprising:
    a discharge path which coupled to a document discharge port,
    wherein the document passing through the discharge path in the duplex scanning operation is fed in only one direction.

6. The image reading device according to claim 1, wherein the duplex document circulating path has a second end coupled to the simplex document feeding path.

7. The image reading device according to claim 6, wherein:
    the simplex document feeding path is sectioned into a first path portion on an upstream side and a second path portion on a downstream side from a junction point with the second end of the duplex document circulating path; and
    the duplex document circulating path and the second path portion have lengths such that a total length thereof is longer than a length of the document.

8. The image reading device according to claim 1, wherein:
    the duplex document circulating path has a second end coupled to the simplex document feeding path;
    the first end of the duplex document circulating path is configured to join the simplex document feeding path; and
    the image reading device further comprises a second path guide unit to close the simplex document feeding path and open the duplex document circulating path when the document having passed through the duplex document feeding path is fed toward the duplex document circulating path.

9. An image forming apparatus comprising:
    an image reading device having document feeding paths to pass a document and a scan unit to read information recorded on the document, wherein the document feeding paths include:
    a supply path connected to a document supply port;
    a simplex document feeding path to branch from the supply path to guide the document from the supply path to reach the scan unit with upper and lower surfaces of the document turned over;
    a duplex document feeding path to branch from the supply path, to guide the document from the supply path to reach the scan unit with the upper and lower surfaces of the document maintained;
    a duplex document circulating path to communicate with the duplex document feeding path to guide the document whose first surface has been scanned by the scan unit to the scan unit with the upper and lower surfaces of the document turned over;

a first path guide unit to close the duplex document feeding path and open a discharge path when the document having passed through the duplex document circulating path is fed toward the discharge path;

a second path guide unit to close the simplex document feeding path and open the duplex document circulating path when the document having passed through the duplex document feeding path is fed toward the duplex document circulating path; and a white roller located opposite the scan unit to rotate in a forward direction and in a reverse direction.

10. The image forming apparatus according to claim 9, further comprising:

a path converting unit mounted on a point where the simplex document feeding path and the duplex document feeding path are bifurcated from the supply path to selectively guide the document having passed through the supply path to one of the simplex document feeding path and the duplex document feeding path.

11. The image forming apparatus according to claim 9, wherein the document feeding paths further include a discharge path connected at a first end to a document discharge port and at a second end to the duplex document feeding path.

12. The image forming apparatus according to claim 11, wherein the duplex document circulating path has a first end to join the simplex document feeding path at a point near the scan unit and a second end to connect to the simplex document feeding path on an upstream side of the point.

13. The image forming apparatus according to claim 9, wherein the first path guide unit has a function of a sensor to detect a position of the document when the document is fed from the duplex document feeding path to the duplex document circulating path.

14. The image forming apparatus according to claim 9, wherein the second path guide unit has a function of a sensor to detect a position of the document when the document is fed from the duplex document circulating path to the discharge path.

15. An image reading device, comprising:

a scan unit;

a simplex document feeding path to guide a document from a supply port to the scan unit in a first direction to scan a first side of the document in a simplex scanning;

a duplex document feeding path to guide the document from the supply port to the scan unit in a second direction to scan the first side of the document in a duplex scanning;

a duplex document circulating path to receive the document in the second direction and to guide the document to the scan unit in the first direction;

a first path guide unit to close the duplex document feeding path and open a discharge path when the document having passed through the duplex document circulating path is fed toward the discharge path; and a second path guide unit to close the simplex document feeding path and open the duplex document circulating path when the document having passed through the duplex document feeding path is fed toward the duplex document circulating path, wherein the simplex document feeding path and the duplex document circulating path share an overlap region, and the overlap region is located linearly between the duplex document feeding path and the duplex document circulating path.

16. The image reading device according to claim 15, wherein the document is scanned by the scan unit in the first direction in the simplex document feeding path, and the document is scanned by the scan unit in the second direction and the first direction in order in the duplex document feeding path.

17. The image reading device according to claim 15, wherein the document comprises a plurality of sheets in order to be fed through the simplex document feeding path and the duplex document feeding path, and the sheets are discharged to be stacked in the same order after being scanned by the scan unit through the simplex and duplex document feeding paths.

* * * * *